United States Patent
Loegel, Sr.

[11] Patent Number: 6,123,102
[45] Date of Patent: Sep. 26, 2000

[54] HIGH PRESSURE SHUT-OFF VALVE

[76] Inventor: Charles Loegel, Sr., 27, Rue de Chateau, F-67340 Lichtenberg, France

[21] Appl. No.: 08/992,358

[22] Filed: Dec. 17, 1997

Related U.S. Application Data

[63] Continuation of application No. 08/294,581, Aug. 23, 1994, abandoned.

[30] Foreign Application Priority Data

Aug. 23, 1993 [DE] Germany .............................. 43 28 299

[51] Int. Cl.$^7$ .................................................. F16K 15/04
[52] U.S. Cl. ...................... 137/529; 137/533.11; 137/534
[58] Field of Search .................................... 137/514, 514.5, 137/529, 532, 533.11, 533.15, 533.17, 533.19, 534

[56] References Cited

U.S. PATENT DOCUMENTS

| | | | |
|---|---|---|---|
| 3,260,279 | 7/1966 | Liebmann | 137/533.15 |
| 3,525,358 | 8/1970 | Ludwig | 137/533.11 X |
| 3,746,038 | 7/1973 | Simmons | 137/514 X |
| 4,736,768 | 4/1988 | Tsubouchi et al. | 137/514 |
| 4,991,495 | 2/1991 | Loegel, Sr. et al. | 92/165 R |
| 5,012,867 | 5/1991 | Kilgore | 137/533.15 X |
| 5,065,790 | 11/1991 | Kornas | 137/514.5 X |
| 5,178,184 | 1/1993 | Skillman | 137/533.15 X |

*Primary Examiner*—John Rivell
*Attorney, Agent, or Firm*—Hopgood, Calimafde, Kalil & Judlowe, LLP

[57] ABSTRACT

In a high-pressure shut-off valve, in particular for a hydraulic pressure system having a relatively high liquid delivery rate, the pressure device of the valve body has a plurality of back support rings arranged as a stack and moveable essentially in the axial direction, i.e., in the direction of the shut-off pressure, forces the valve body onto the valve seat, such that neighboring back support rings bear against one another, causing the valve body to lift from the valve seat, whereas in the shut-off position, the neighboring back support rings inside the hydraulic system, which is under a relatively high shut-off pressure, are at a slight spacing from one another.

18 Claims, 3 Drawing Sheets

$N = n \times G + (n-1) \cdot H$ $S_{min} : N_{min} = n \cdot G \quad (H = 0)$ $S_{max} : N_{max} = n \cdot G + (n-1) \cdot H$ $S_{min} \leq S_0 < S_{max}$ $D_{max} = S_{max} - S_{min} = (n-1) \cdot H$ $m \approx n - 1$

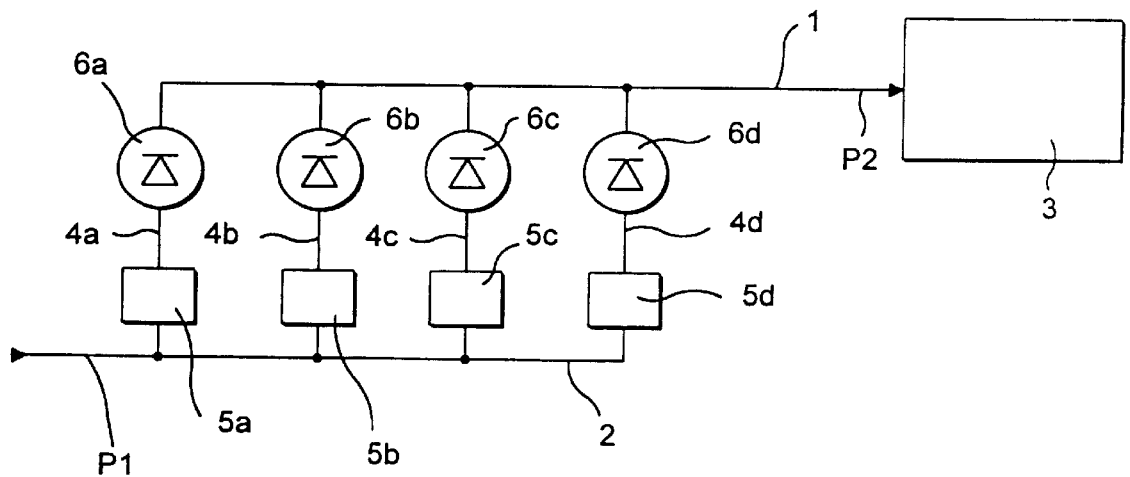
F I G. 1
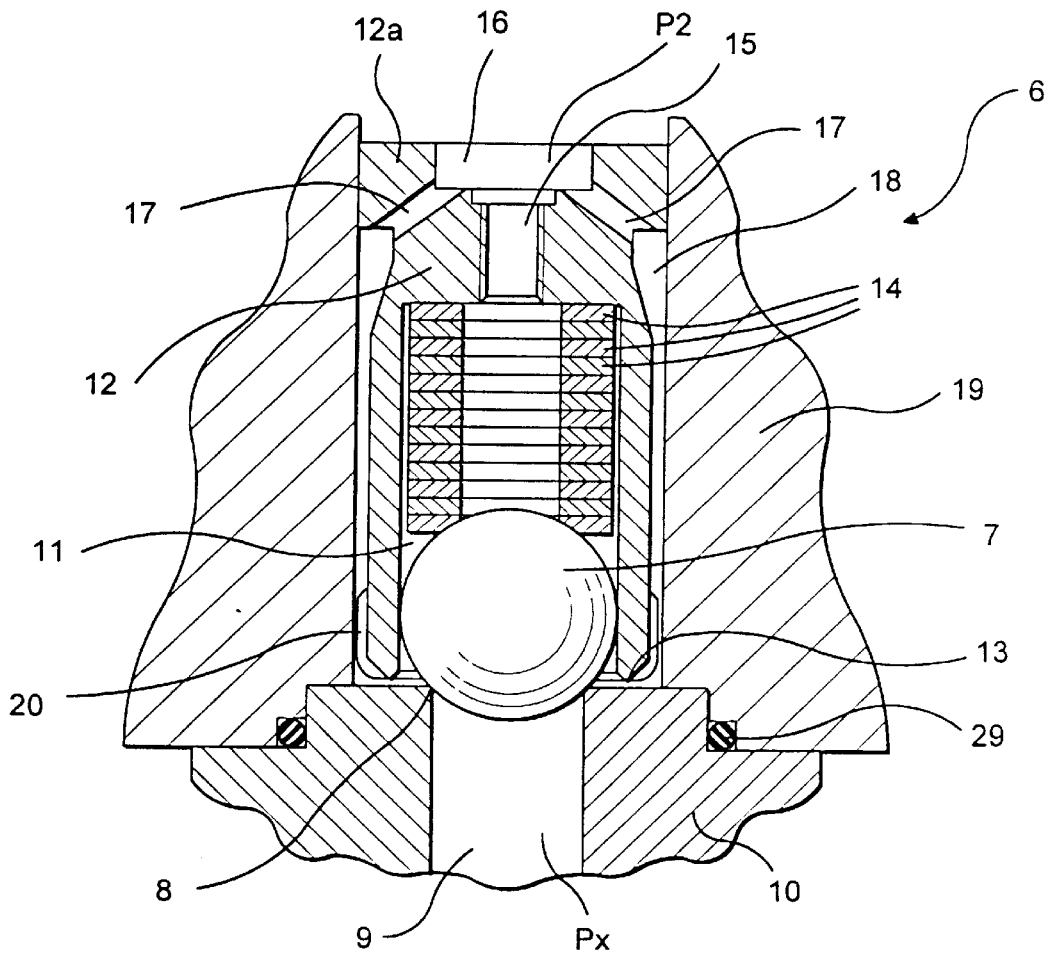
F I G. 2

HIGH PRESSURE SHUT-OFF VALVE

This Application is a Continuation of application Ser. No. 08/294,581, filed Aug. 23, 1994, now abandoned the disclosure of which is hereby incorporated by reference in its entirety.

DISCLOSURE OF THE INVENTION

The present invention relates generally to valves for use with liquids under relatively high pressure and, more particularly, to a shut-off valve for a high delivery rate hydraulic pressure system.

Shut-off valves, which act as so-called "check or threshold valves" or automatic flow switches, typically have a valve body shaped like a ball. See, for example, (Europa-Lehrmittel "Kraftmaschinen, Fördermittel, Kraftübertragungselemente" ["Prime movers, delivery means, power transmission elements"], 1st edition, page 57). In this case, a compression spring is often used as the pressure device. With pressure systems having relatively high delivery rates, for example, over 10 l/min in the common pressure line, a plurality of delivery pumps are connected to the pressure line via dedicated shut-off valves. In each case, however, considerable wear of the valve seat occurs even after a relatively short operating time of, e.g., about 30 seconds.

It is therefore an object of the present invention to improve operation of a high-pressure shut-off valve simply and efficiently, even under conditions of a high delivery rate such as 50 l/min and high pressure such as 2400 bars, so as to achieve a relatively long service life.

It has now been discovered that these objectives are achieved using a plurality of separate back support rings as the pressure device, instead of a compression spring. The back support rings are stacked and arranged in a pressure chamber. The chamber is maintained at about the same pressure as the hydraulic high-pressure system which generates the valve body shut-off pressure on the valve seat. If the shutoff pressure is higher than the back pressure (which tends to lift the valve body from the valve seat), the back support rings are located inside the hydraulic medium at a very small spacing from one another. In the case where the back pressure against the valve body exceeds the shut-off pressure, the back support rings bear against one another. This causes the valve body to lift from the valve seat by amount corresponding to the sum of the individual spacings of the back support rings from one another in the shut-off position of the valve body.

As compared to a compression spring, the shut-off valve construction of the present invention not only increases the delivery rate by about 10% from approximately 50 l/min, but also shortens the operating time to between about 30 and about 40 hours. In conjunction with these improvements, the pressure system (as measured by a manometer) is maintained at about the same pressure, for example, 2400 bars, and virtually no wear phenomena occur on the valve seat. This "no wear" phenomena is believed to reside in the fact that no "blows" occur upon release of a tensioned spring come to act on the valve seat.

Further embodiments of the present invention are claimed in the subclaims. Preferably, the valve body is a ball with a holding sleeve arranged on the outer free end of a pressure chamber in which a stack or packet of back support rings are located. It is also preferred that the diameter selected for the holding chamber, at its free end, only be so large that there is slight play between the shut-off position of the valve ball and the position where it is lifted from the valve body. Accordingly, the ball cannot be pressed far into the holding chamber, but rather shuts off the through passage of liquids between the valve ball and the lateral surface of the pressure chamber.

For the chamber to be under the hydraulic pressure of the pressure system and, thus, under the shut-off pressure, it is connected to the pressure line by a through channel. According to one embodiment of the present invention, a flow path is provided around the holding sleeve for the liquid, from the outer free end of the sleeve in a region of the valve body along the outer lateral surface, and through diversion channels and openings to the through channel. It is considered relatively important that the liquid be under the shut-off pressure, inside the pressure chamber, so that it can flow through bores in the back support rings, interspaces between the outer rims of the back support rings, and an inner lateral surface of the pressure chamber. This permits quick and effective isolation (or spacing apart) of the individual back support rings.

According to the present invention, it has also been discovered that special dimensioning of the through cross section at the valve seat, relative to the through cross section at the inlet, provides other advantages. In this connection, it is preferred that an orifice be provided at the through diameter, leading along the flow path to the valve seat of about 65% to about 80%, in particular between about 70% and about 75% of the valve seat diameter. Such an orifice is arranged expediently between the floor of a cut-out in the pressure plate (which forms the valve seat) and an annular cut-out on the end face of a shoulder of a distributor member. The axial inner bore of the distributor member forms a through opening for liquids which lead, for example, to and from a pump. The annular cut-out on the end face of the distributor member shoulder is preferably connected, via connecting channels, to the outer lateral surface of the connecting piece. Accordingly, liquid passes through the connecting channels, into the annular cut-out, then through the axial inner bore to the pump. With pressure applied, the liquid flows back through the axial inner bore and, from there, to the valve seat via the bore in the orifice.

If the pressure generated by the pump is higher than the pressure in the hydraulic pressure system (which serves as the contact pressure), the valve body is lifted from the valve seat. The liquid then flows through the shut-off valve and into the pressure line. The delivery rate of the liquid system is increased by the parallel connection of such shutoff valves between the pressure line and the induction line, in each case with appropriate pumps. Such a temporal arrangement of lifting the valve body of each pump from the valve seat occurs such that lifting of the shut-off valves connected in parallel does not take place simultaneously but over a specific period.

A shut-off valve, according to the various embodiments of the present invention, is particularly advantageous for use in liquid injection systems where a liquid such as water is sprayed through nozzles under high pressure onto hard objects such as stone, granite, or concrete, to form narrow slots therein.

The present invention will now be further described by reference to the following drawings which are not intended to limit the accompanying claims.

FIG. 1 is a schematic block diagram of an installation of shut-off valves of a pressure system in parallel connection, in accordance with one aspect of the present invention;

FIG. 2 is a schematic sectional view of the present invention in the case of a check valve;

Figure 3:
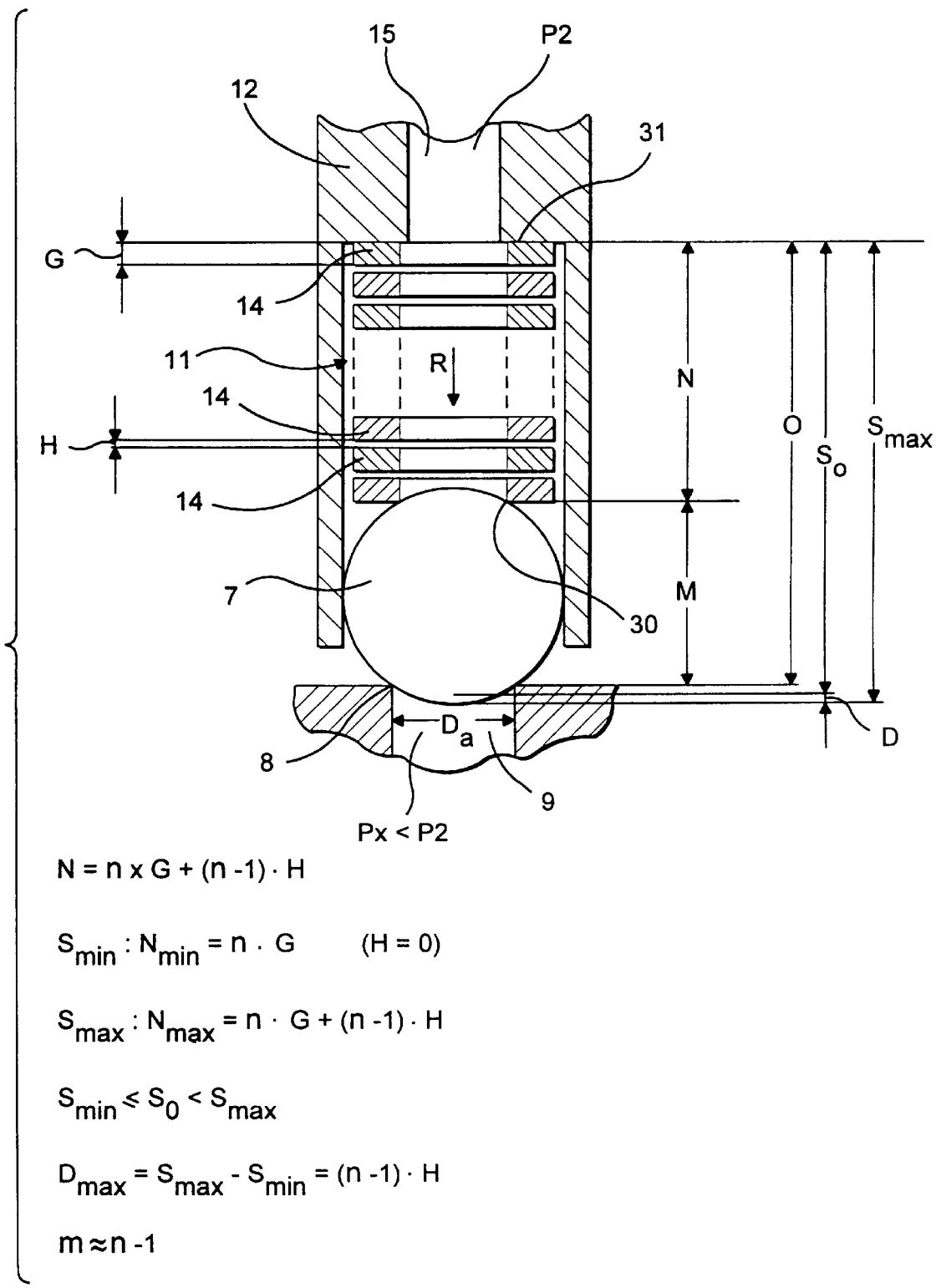
FIG. 3 is an enlarged schematic representation of the present invention.

In accordance with one aspect of the present invention, as shown in FIG. 1, liquid delivery means 5a, 5b, 5c, 5d are connected, respectively, in parallel via connecting lines 4a, 4b, 4c, 4d and shut-off valves 6a, 6b, 6c and 6d, constructed as a check valve, between a pressure line 1 which is under a relatively high shut-off pressure $P_2$, e.g., 2400 bar, and a suction line 2 under a generally lower suction pressure $P_1$. Pressure was measured using a manometer.

In one embodiment, the pressure line operates a high-pressure water jet system 3 having a delivery rate of more than about 50 1/min. The delivery means are, for example, high-pressure pumps capable of generating in the connecting lines higher pressures than shut-off pressure $P_2$ in pressure line 1. This causes each respective valve body to lift from the valve seat in the high-pressure shut-off valves, and thereby triggers the feeding of liquid into pressure line 1 via the respective shut-off valves.

In FIG. 2, shut-off valve 6 has a valve body 7 shaped as a ball which bears against valve seat 8 so as to diminish liquid flow. The valve seat is located at the end of axial bore 9 through pressure plate 10. Prevailing in bore 9 is pressure $P_x$ which, in the case of the shut-off position of valve body 7, is lower than pressure $P_2$ in pressure system 1.

Valve body 7 is located in holding sleeve 12 at the end of pressure chamber 11. The diameter of the chamber decreases in the axially inward direction, starting at free outer end 13, in such a way that inward penetration by the valve body beyond a selected amount is limited, and that, in this position, which is furthest into the chamber, the pressure chamber is sealed to some degree in the direction of free outer end 13. Inside chamber 11 is a stack of back support rings 14. The latter have a somewhat smaller outside diameter than that of the chamber, so that the liquid of the hydraulic means having pressure $P_2$ is connected by means of through channel 15 to pressure line 1 (not shown).

On end face 12a of holding sleeve 12 is a cut-out 16 connected to pressure line 1 in a way not represented here, and also connected via openings 17 to space 18. This forms an outer groove in the holding sleeve bounded on the outside by machine part 19.

Arranged around outer free end 13 of the holding sleeve are ribs which extend radially in a generally star-shaped fashion. Between the ribs are axial through channels 20 between valve seat 8 and space 18 formed by the outer groove.

Through channel 15 is provided with an internal thread, allowing screw reception of a screw bolt and extraction of the holding sleeve during dismounting from plate 19. An O-ring seal 29 is located between pressure plate 10 and machine part 19.

Although in FIG. 2 back support rings 14 are shown in abutment to one another when the valve body is pressed onto the valve seat, in the shut-off position, the back support rings are actually at a very slight spacing of between about 10 μm and about 100 μm from one another. In other words, in the shut-off position the back support rings are located, in accordance with the greatly enlarged representation of FIG. 3, at a spacing H from one another. If the stack of back support rings with ring thickness D comprise n back support rings, and if n−1 spacings H are thereby formed between neighboring back support rings, the maximum spacing $N_{max}$ between support 30 (of lowermost back support ring 14 in FIG. 3) and the ball surface is:

$$N_{max}=n \cdot G+(n-1) \cdot H$$

This assumes that the shut-off pressure $P_2$ in the liquid also prevails in the pressure chamber. It further assumes that the liquid fills spacing H between the back support rings and presses the valve body onto the valve seat in direction R as long as the liquid pressure $P_x$ in channel 9 (below the valve seat) is lower than shut-off pressure $P_2$.

If, by contrast, pressure $P_x$ becomes higher than shut-off pressure $P_2$, the valve body is pressed up from the valve seat by, for example, a distance D. Spacings H between the back support rings diminish until they vanish in the end position. The minimum spacing between shoulder 31 and support line 30 (of lowermost back support ring 14) and the ball surface is:

$$N_{min}=n \cdot G$$

Spacing N, supplemented by spacing M between support line 30 of the lowermost back support ring on the ball surface and the valve seat, supplement one another to form a total distance 0 between the valve seat and shoulder 11 at the inner end of the pressure chamber.

The total distance between shoulder 31, which serves as a stop, and the lower end of the valve body in the shut-off position is $S_{max}$. So, the position where the valve body is pressed furthest upwards (where the back support rings abut one another and are in intermediate positions) is a function of the distance D by which the valve body is pressed upwards, with a corresponding gap between its lateral surface and the valve seat. The maximum distance corresponding to a first approxi-mation of the spacing between the ball surface of the valve body and the valve seat is:

$$D_{max}=S_{max}-S_{min}(n-1) \cdot H$$

This assumes a number m of spacings H of about n−1.

Use is made in one exemplary embodiment of 12 back support rings having a ring thickness D of about 2 mm, an inside diameter of about 10 mm, and an outside diameter of about 17.5 mm. The ball diameter is about 18 mm. The diameter $D_a$ of the channel (or inner bore 9), which further corresponds to the diameter of valve seat 8, is about 10 mm. This is the same as the inside diameter of the back support rings. The circumference of the valve seat is therefore:

$$U=\pi \cdot D_a=31.4 \text{ mm}$$

The flow cross section between the valve seat and the valve body, in the position of the latter which is lifted furthest from the valve seat (in the case of $D_{max}$), is about 25 mm² where $D_{max}$ is about 0.8 mm.

Figure 4:
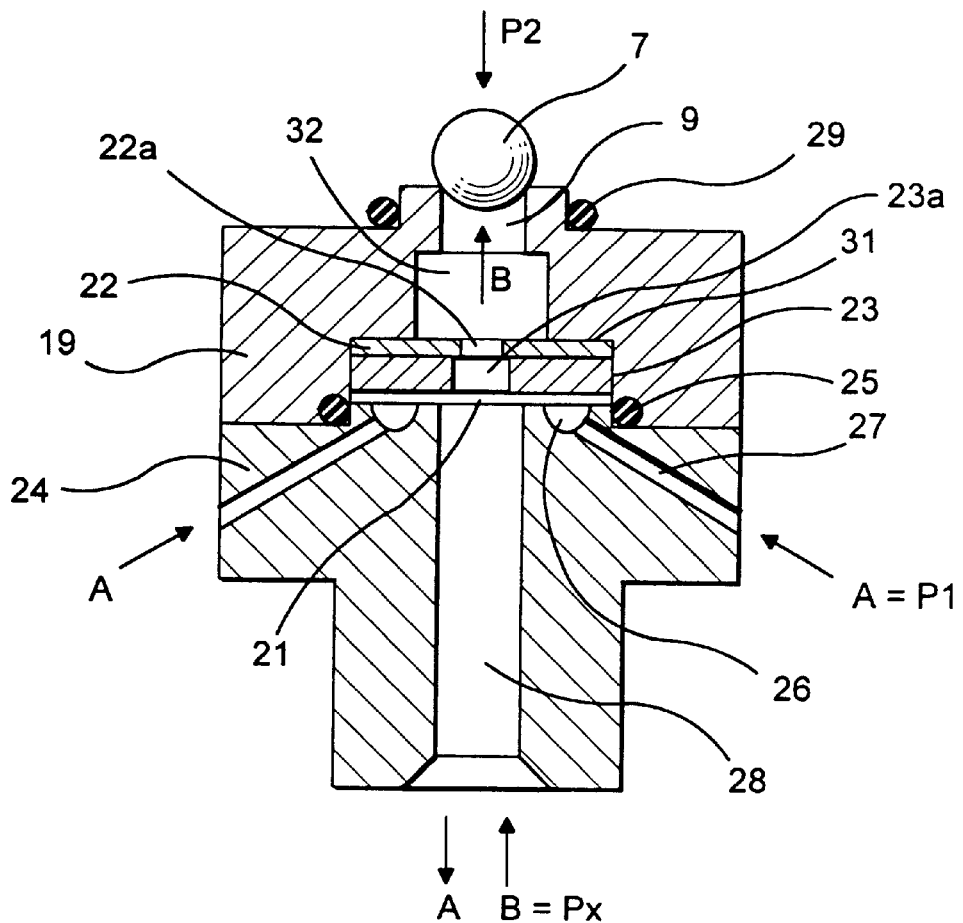
FIG. 4 is a partial section view taken through a feed line, showing the shut-off position of the valve body, the inside of a pressure plate forming the valve seat, and an adjoining distributor member.

As illustrated in FIG. 4, pressure plate 19 has a cut-out 21 which holds two orifices 22, 23, each having an orifice opening 22a, 23a, respectively. The cross section of the smallest orifice opening 22a determines the flow cross section of the liquid, which is pressed in flow direction B under pressure $P_x$ against the valve body via, e.g., a high-pressure pump. This is because orifices 22, 23 are pressed against stop 31 at the inner end of the cylindrical cut-out.

According to the present invention, it has also been discovered that selected relationships between the smallest flow cross section at orifice opening 22a and the flow cross section at the valve seat, in the lifted position of the valve-body, offer special advantages. More particularly, without orifices 22, 23, "blows" occur in the high-pressure system if, for instance, pressure line 1, which may be a flexible hose, is stepped on. Should the flow cross section of orifice opening 22a not be excessively larger than the flow cross section at the valve seat in the position where the valve body is lifted most, such "blows" are substantially lessened.

Optimum conditions may be found at a diameter $D_a$ of about 10 mm and a flow cross section $F_8$ of about 25 mm² at the valve seat, where the position of the valve body is lifted furthest. The diameter of orifice opening 22a is about 7.2 mm. The cross-sectional area $F_{22a}$ of orifice opening 22a is then about 40.69 mm². The ratio of the flow cross section $F_{22a}$ at orifice opening 22a to flow cross section $F_8$ at the valve seat is about 1.62.

Figure 5:
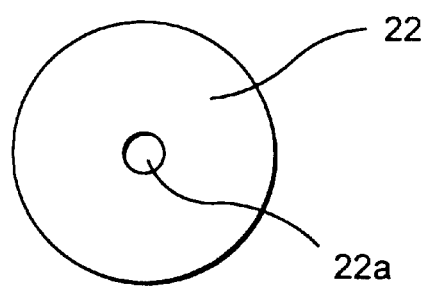
FIG. 5 is a plan view of an orifice, according to the present invention.

It is desirable to select a cross-section ratio $F_{22a}:F_8$ generally with a range of 1.2 and 2.0, in particular between about 1.4 and about 1.8. It is considered advantageous when an interspace 32 having a substantially larger diameter than orifice opening 23a is formed between orifice 22 (FIG. 5) and the valve body 7, as it causes the absorption of "pressure waves".

Cylindrical chamber 21 in pressure plate 19 is sealed below by a shoulder of a distributor member 24 by means of an O-ring 25. Arranged on the end face of the distributor member, facing orifices 22, 23, is an annular cut-out 26. Leading into this cut-out are connecting lines 27, which guide liquid in direction A of the arrow from suction line 2 (under suction-line pressure $P_1$), into cylindrical chamber 21, and thereby also into channel 28. From there, still in direction A, the liquid passes to the pump (not shown) during its suction stroke. If the pump executes an oppositely directed pressure stroke, the liquid is forced back in direction B of the arrow under liquid pressure $P_x$ until it exceeds the shut-off pressure $P_2$, and is conveyed in the way described above into pressure line 1 with valve body 7 lifted.

Since from the foregoing the construction and advantages of the invention may be readily understood, further explanation is believed unnecessary. However, since numerous modifications will readily occur to those skilled in the art after consideration of the foregoing specification and accompanying drawings, it is not intended that the invention be limited to the exact construction shown and described, but all suitable modifications and equivalents may be resorted to which fall within the scope of the appended claims.

What is claimed is:

1. A shut-off valve for liquid under relatively high pressure in a pressure system, of a type having a valve body which shuts off the through opening at a valve seat in the shut-off position under a shut-off pressure through a pressure device pressing against the valve body until the liquid pressure is higher than the shut-off pressure, lifting the valve body from the valve seat, wherein the pressure device has a number (n) of back support rings arranged next to one another or stacked one above the other in such a way that the axial direction (R) of the in stack or of the back support rings corresponds generally to the direction of the shut-off pressure ($P_2$) of the liquid under pressure on the valve body against the valve seat, and can be moved generally in the axial direction (R) in such a way that neighboring back support rings are axially displaceable sufficiently to permit the valve body to lift from the valve seat wherein a minimum axial clearance is established between adjacent ones of the back support rings, the valve body being movable to a shut-off position, by contrast, when the shut-off pressure becomes sufficiently great causing the fluid pressure to increase along successive back support rings leading to the valve body, the minimum axial clearance between adjacent ones of the back support rings being sufficient such that the successive increases in fluid pressure provide a fluid pressure differential across the back support rings, the fluid pressure differential decreasing toward the valve body providing successive increases in the axial clearance between adjacent ones of the back support rings, the fluid pressure differential being for a limited time period and the fluid pressure increase being sufficiently large to limit the increase in the axial clearances, the successive increases in the axial clearances displacing the back support ring toward the valve body to displace the valve body into seating engagement with the valve seat.

2. The shut-off valve set forth in claim 1, wherein the pressure in the pressure system is over about 1000 bars.

3. The shut-off valve set forth in claim 1, wherein a maximum clearance ($D_{max}$) corresponds to the sum (m) of the individual clearances (H) between the back support rings.

4. The shut-off valve set forth in claim 1, wherein the back support rings are arranged in a pressure chamber of a holding sleeve on whose outer free end the valve body is located, while the inner end of the pressure chamber serves as a stop for the innermost back support ring and is connected by means of a through channel to the liquid under the shut-off pressure ($P_2$).

5. The shut-off valve set forth in claim 1, wherein the valve body is shaped like a ball which is at least partially receivable in a holding sleeve.

6. The shut-off valve set forth in claim 4 or claim 5, wherein the holding sleeve has a diameter which increases towards the free end in such a way that the back support rings are spaced radially from the chamber wall, while the valve body can enter only a little way into the holding chamber and seal the latter in a pressed-back position.

7. The shut-off valve set forth in claim 4, wherein the holding sleeve has diversion channels for the liquid outside the pressure chamber from the outer free end of the latter up to the through channel.

8. The shut-off valve set forth in claim 5, wherein the holding sleeve has diversion channels for the liquid outside the pressure chamber from the outer free end of the latter up to the through channel.

9. The shut-off valve set forth in claim 6, wherein the holding sleeve has diversion channels for the liquid outside the pressure chamber from the outer free end of the latter up to the through channel.

10. The shut-off valve set forth in claim 7, wherein the holding sleeve has openings which lead from an outer groove through the holding sleeve into an inner space which is located at the end of the holding sleeve which is averted from the outer free end of the pressure chamber.

11. The shut-off valve set forth in claim 1, wherein the valve seat is located on a pressure plate which has a cutout for holding at least one orifice which bounds the through cross section of liquid relative to the valve seat.

12. The shut-off valve set forth in claim 11, wherein the orifice has an opening with a diameter of about 0.65–0.8% the diameter ($D_a$) of the valve seat.

13. The shut-off valve set forth in claim 10, wherein the diameter of the orifice opening is about 0.7 to about 0.75 times the valve seat diameter ($D_a$).

14. The shut-off valve set forth in claim 11, wherein the orifice is arranged inside the cut-out between the cut-out floor and an annular cut-out on the end face of a shoulder of a distributor member whose axial inner bore forms a through opening for liquid, and wherein the annular cut-out is connected via connecting channels to the outer lateral surface of the distributor member and a suction line.

15. The shut-off valve set forth in claim 12, wherein the orifice is arranged inside the cut-out between the cut-out floor and an annular cut-out on the end face of a shoulder of a distributor member whose axial inner bore forms a through opening for liquid, and wherein the annular cut-out is connected via connecting channels to the outer lateral surface of the distributor member and a suction line.

16. The shut-off valve set forth in claim 13, wherein the orifice is arranged inside the cut-out between the cut-out floor and an annular cut-out on the end face of a shoulder of a distributor member whose axial inner bore forms a through opening for liquid, and wherein the annular cut-out is connected via connecting channels to the outer lateral surface of the distributor member and a suction line.

17. A shut-off valve for liquid comprising:
   a pressure plate having an axial bore opening into a valve seat;
   a holding sleeve having an inner surface defining a pressure chamber opening into an outer free end, said holding sleeve being oriented relative to said valve seat such that longitudinal central axes of said pressure chamber and said axial bore are coaxial;
   a plurality of back support rings disposed within said pressure chamber such that the radial plane of each of said back support rings is perpendicular to the longitudinal central axis of said pressure chamber, each of said back support rings having an outer edge and being sized to provide a radial clearance between said outer edge and inner surface allowing longitudinal displacement of said back support rings relative to said inner surface; and
   a valve member disposed in said pressure chamber adjacent to said outer free end, said valve member having an outer surface and being sized to provide a radial clearance between said outer surface and inner surface allowing longitudinal displacement of said valve member relative to said inner surface,
   said valve member being movable between an open position allowing fluid flow through said axial bore and a closed position obstructing fluid flow through said axial bore wherein, when said valve member is in said open position, said valve member is lifted off of said valve seat by displacement of said valve member into said pressure chamber reducing an axial clearance between adjacent ones of said back support rings to a predetermined minimum axial clearance, said valve member being movable to said open position when the fluid pressure in said axial bore is sufficiently greater than the fluid pressure in said pressure chamber,
   said valve body being movable to said closed position when the fluid pressure in said fluid chamber increases sufficiently along successive ones of said back support rings leading to said valve member, said minimum axial clearance being sufficient such that the fluid pressure increase in said pressure chamber provides fluid pressure differentials across said back support rings, the fluid pressure differentials decreasing toward said valve member providing successive increases in said axial clearances between adjacent ones of said back support rings leading to said valve member, the fluid pressure differentials being for a limited time period and the fluid pressure increase being sufficiently large to limit said increases in said axial clearances, said successive increases in said axial clearances displacing said back support rings toward said valve member to displace said valve member into seating engagement with said valve seat.

18. A shut-off valve for liquid comprising;
   a pressure plate having an axial bore opening into a valve seat;
   a holding sleeve having an inner surface defining a pressure chamber opening into an outer free end, said holding sleeve being oriented relative to said valve seat such that longitudinal central axes of said pressure chamber and said axial bore are coaxial;
   a plurality of back support rings disposed within said pressure chamber such that the radial plane of each of said back support rings is perpendicular to the longitudinal central axis of said pressure chamber, each of said back support rings having an outer edge and being sized to provide a radial clearance between said outer edge and inner surface allowing longitudinal displacement of said back support rings relative to said inner surface; and
   a valve member disposed in said pressure chamber adjacent to said outer free end, said valve member having an outer surface and being sized to provide a radial clearance between said outer surface and inner surface allowing longitudinal displacement of said valve member relative to said inner surface,
   said valve member being movable between an open position allowing fluid flow through said axial bore and a closed position obstructing flow through said axial bore wherein, when said valve member is in said open position, said valve member is lifted off of said valve seat by displacement of said valve member into said pressure chamber, said valve member being movable to said open position when the fluid pressure in said axial bore is sufficiently greater than the fluid pressure in said pressure chamber, said valve member being movable to said closed position when the fluid pressure in said pressure chamber becomes sufficiently greater than the fluid pressure in said axial bore.

* * * * *

UNITED STATES PATENT AND TRADEMARK OFFICE
CERTIFICATE OF CORRECTION

PATENT NO. : 6,123,102
DATED : September 26, 2000
INVENTOR(S) : Charles Loegel, Sr.

It is certified that error appears in the above-identified patent and that said Letters Patent is hereby corrected as shown below:

<u>Column 6,</u>
Line 13, delete "ring" and insert -- rings --.

Signed and Sealed this

Ninth Day of April, 2002

Attest:

JAMES E. ROGAN
*Attesting Officer*     *Director of the United States Patent and Trademark Office*